United States Patent [19]

Shimizu

[11] Patent Number: 5,794,443

[45] Date of Patent: Aug. 18, 1998

[54] AXLE DRIVING APPARATUS

[75] Inventor: Hiroaki Shimizu, Amagasaki, Japan

[73] Assignee: Kanzaki Kokyukoki Mfg. Co., Ltd., Japan

[21] Appl. No.: 719,447

[22] Filed: Sep. 25, 1996

[30] Foreign Application Priority Data

Jan. 8, 1996 [JP] Japan .................... 8-001006

[51] Int. Cl.⁶ .................... F16D 31/02
[52] U.S. Cl. .................... 60/456; 60/487
[58] Field of Search .................... 60/456, 487

[56] References Cited

U.S. PATENT DOCUMENTS 4,932,209  6/1990  Okada et al.
5,211,077  5/1993  Louis et al. .................... 60/487 X
5,377,487  1/1995  Azuma et al. .................... 60/487
5,394,699  3/1995  Matsufuji .................... 60/487 X
5,440,951  8/1995  Okada et al. .................... 60/456 X Primary Examiner—Hoang Nguyen
Attorney, Agent, or Firm—Sterne, Kessler, Goldstein & Fox P.L.L.C.

[57] ABSTRACT

An axle driving apparatus housing therein a hydrostatic transmission and axles driven thereby a cooling fan which is provided on a power input shaft of the hydrostatic transmission. A cavity-like through opening is formed in a portion of the housing between the hydrostatic transmission and the axles. The peripheral wall of the opening is formed with a plurality of cooling fins. The cooling fan is rotated by the power input shaft to create wind to cool heat generated in the housing.

6 Claims, 11 Drawing Sheets

AXLE DRIVING APPARATUS

The present invention relates to an axle driving apparatus, and more particularly to an axle driving apparatus which is provided in a housing thereof with a hydrostatic transmission (hereinafter referred to as HST) so as to improve the cooling efficiency for oil stored in the housing.

BACKGROUND OF THE INVENTION

It has been well-known to construct an axle driving apparatus with an HST, a differential gear unit and axles housed in a housing having an oil sump formed therein. The HST comprises a hydraulic pump and a hydraulic motor which are disposed on a center section. The hydraulic pump is driven by an input shaft. Pressurized oil is sent from the hydraulic pump to the hydraulic motor which is fluidly connected therewith. The axles are driven by an output shaft of the hydraulic motor. This is disclosed in, for example, U.S. Pat. No. 4,932,209. In this design, when the temperature of the oil stored in the housing of the axle driving apparatus rises due to driving the hydraulic pump and motor, the deterioration of a sealing member and operating oil or the like is increased, so that the viscosity of the oil is reduced which lowers the efficiency of the HST. Hence, a cooling fan can be provided on a portion of the input shaft which projects outwardly from the housing. Cooling fins can also be provided to project from a portion of the housing opposite to the cooling fan so that the oil in the housing is cooled through a portion of the housing.

In this conventional construction, however, the cooling wind generated by the rotation of cooling fan acts only on a small area of the housing which reduces the cooling efficiency of the fan. Accordingly, the cooling capacity of the cooling fan restricts the ability to continuously use the HST.

SUMMARY OF THE INVENTION

The HST and the axles driven thereby housed in the housing are heated by frictional heat or by a flow of operating oil when power is transmitted from the input shaft and the speed is changed by the HST and is transmitted to the axles. An object of the present invention is to quickly cool the heat generated in the axle driving apparatus. In order to attain this object, a cooling fan, which is provided at a portion of the power input shaft of the HST which extends outwardly from the housing, generates a cooling wind when the power input shaft rotates. A cavity-like opening is formed in a portion of the housing between the HST and the axles and is disposed opposite to the cooling fan. A large number of fins are provided on the peripheral wall of the cavity-like opening. When the wind from the cooling fan passes through the cavity-like opening, the fins perform heat-exchange, thereby efficiently cooling the operating oil in the HST in the housing.

The above and other objects and novel features of the invention will more fully appear from the following detailed description when the same is read in connection with the accompanying drawings.

DETAILED DESCRIPTION OF THE PREFERRED EMBODIMENTS

Figure 1:
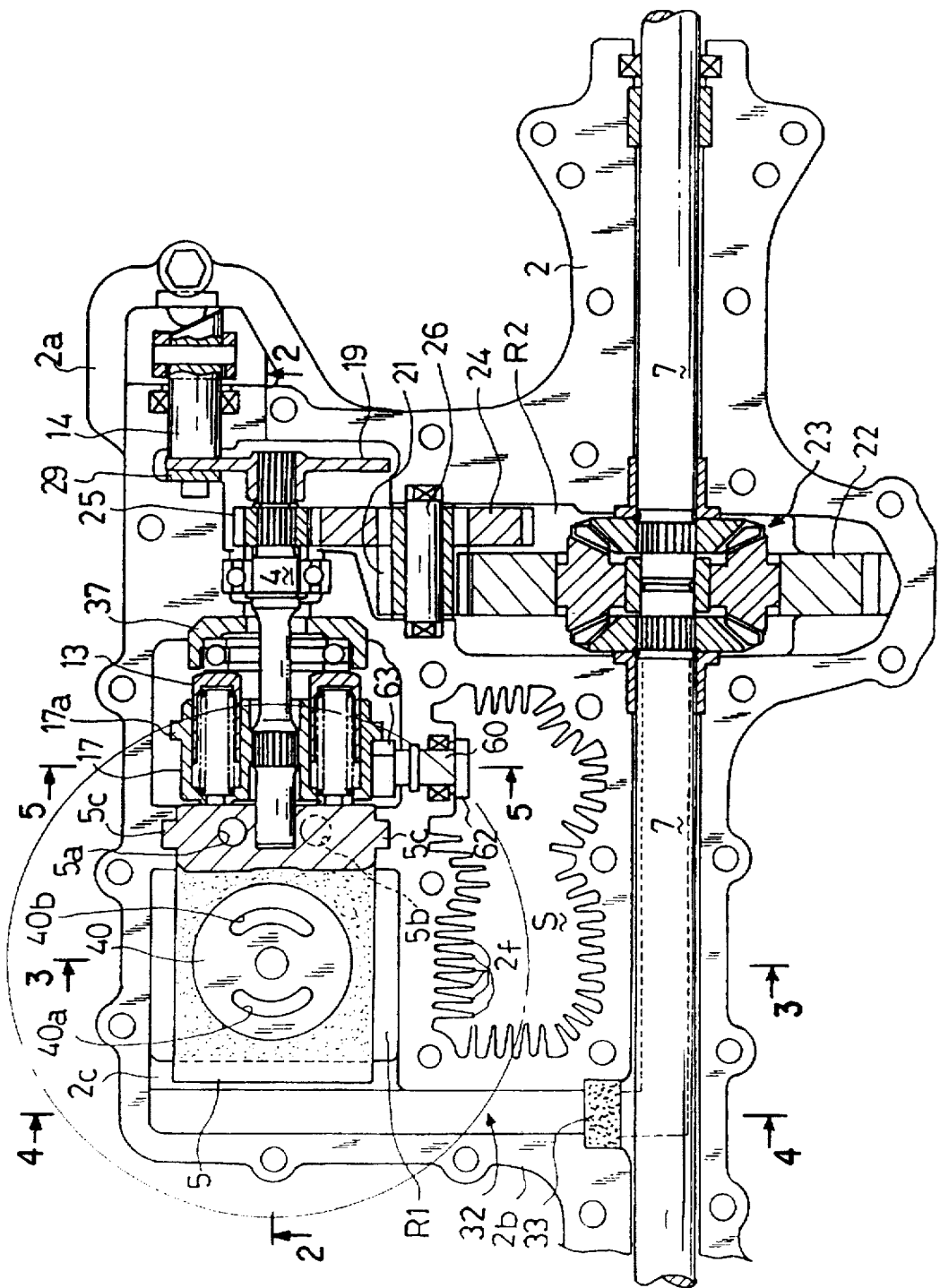
FIG. 1 is a partially sectional plan view of the axle driving apparatus, from which an upper half housing portion of the housing is removed.

Explanation will be given on the entire construction of the axle driving apparatus of the present invention in accordance with FIGS. 1 through 4, in which a housing of the axle driving apparatus comprises an upper half housing 1 and a lower half housing 2 which are coupled with each other through a flat peripheral joint surface extending horizontally. At the joint surface of both the half housings are provided bearings for the axles 7, a motor shaft 4 and a counter shaft 26. The axles 7 are differentially connected with each other by a differential gear unit 23 and project at both ends laterally outwardly from the housing.

The housing is partitioned at the interior thereof into a first chamber R1 for housing therein the HST and a second chamber R2 for housing therein a drive train, the differential gear unit 23 and the axles 7. The first chamber R1 and second chamber R2 are each filled with lubricating oil so as to form an oil sump.

In the first chamber R1 is disposed a center section 5 which is L-like shaped when viewed in side cross-section. A pump mounting surface 40 is formed on an upper horizontal surface of the center section 5 and a cylinder block 16 is rotatably slidably disposed on the pump mounting surface 40. Pistons 12 are reciprocally movably fitted in a plurality of cylinder bores formed in the cylinder block 16. The heads of the pistons 12 abut against a thrust bearing 11a of movable swash plate 11. At the center thereof is provided an opening 11b through which a pump shaft 3 can perforate. The pump shaft 3 also serves as a power input shaft and integrally engages with the rotary axis of cylinder block 16. Pump shaft 3 is disposed vertically. The upper portion thereof projects upwardly from the upper wall of the upper half housing 1. Fixed at the upper end of input shaft 3 is an input pulley 43 and a cooling fan 44. Power is inputted into the input pulley 43 from a prime mover (not shown) through a conventional belt mechanism.

Figure 2:
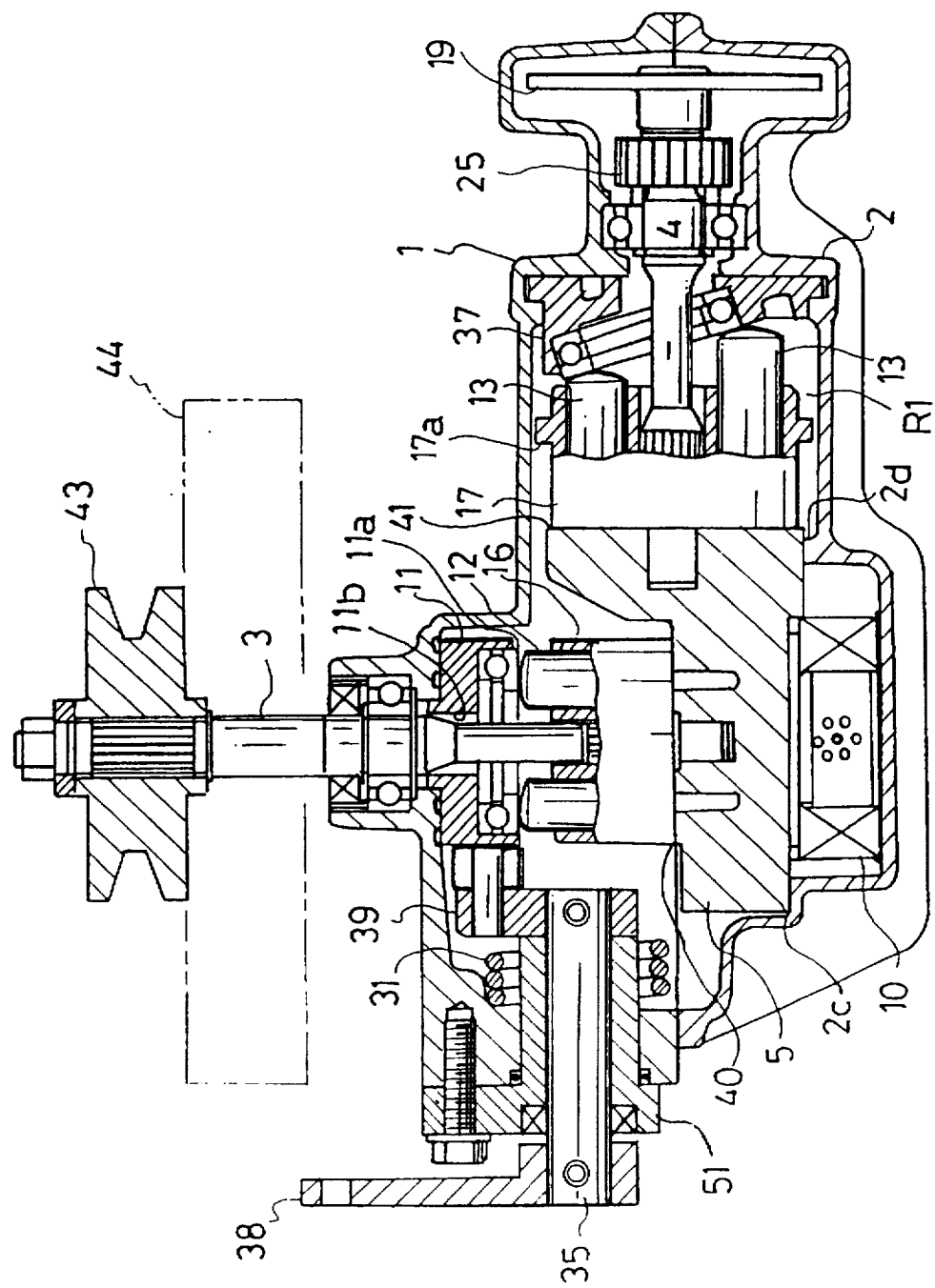
FIG. 2 is a sectional view looking in the direction of the arrows 2—2 in FIG. 1.
Figure 3:
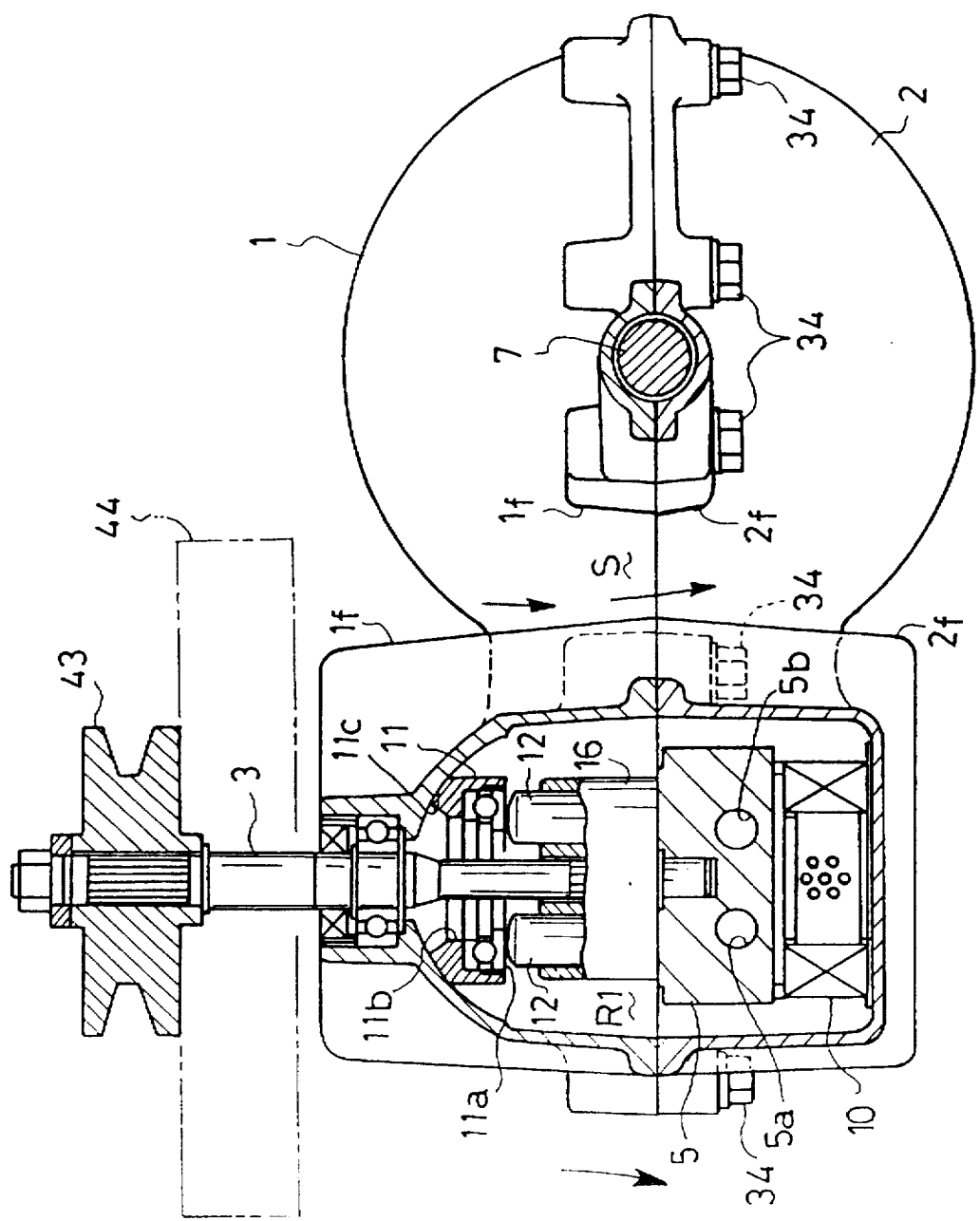
FIG. 3 is a sectional view looking in the direction of the arrows 3—3 in FIG. 1.

The piston abutting surface of the movable swash plate 11 is operated slantingly longitudinally from the horizontal state with respect to the rotary axis of the cylinder block 16 when viewed in FIG. 3, thereby changing the amount and the direction of oil discharged from the hydraulic pump. A convex semi-circular or arc-shaped surface 1c is formed at the rear of the movable swash plate 11. A concave, semi-circular or arc-shaped surface, coincident in formation with surface 11c is formed at the inner surface of the upper wall of the upper half housing 1. Movable swash plate 11 slantingly moves along the inner surface of the upper half housing 1. A control shaft 35 is disposed at the side wall of the upper half housing 1 and is positioned on the extension line of the center of curvature of the convex semi-circular or arc-shaped surface 11c. The control shaft 35, as shown in FIG. 2, is rotatably supported in a cylindrical bush 51 fitted into the side wall of the upper half housing 1. A control arm 38 is fixed to the outer end of the control shaft 35 so as to operate the movable swash plate 11 from the exterior of the housing. Control arm 38 is connected through a link or the like with a speed changing member, such as a pedal or a lever (not shown) provided in the vehicle. A swinging arm 39 is fixed to an inner end of the control shaft 35 in the housing and engages with the movable swash plate 11. The control shaft 35 is operated by the control arm 38 to longitudinally slantingly move the movable swash plate 11. Onto the outer periphery of the bush 51 is fitted a neutral return spring 31, by which the movable swash plate 11 is biased toward the neutral position through the swinging arm 39.

At the vertical outside surface of the center section 5 is formed a motor mounting surface 41, on which a cylinder block 17 is rotatably slidably disposed. A plurality of pistons 13 are reciprocally movably fitted into a plurality of cylinder bores in the cylinder block 17 through biasing springs. A fixed swash plate 37 abuts against the heads of pistons 13 and is fixedly sandwiched between the upper half housing 1 and the lower half housing 2. A motor shaft 4 engageable with the rotary axis of cylinder block 17 is horizontally disposed and is rotatably supported by the vertical portion of center section 5 and by a bearing with a sealing member held between the upper half housing 1 and the lower half housing 2. A pair of oil feed and discharge ports at the cylinder block 16 of the hydraulic pump and a pair of the same at the cylinder block 17 of the hydraulic motor are fluid-connected with each other by a closed fluid circuit provided in the center section 5, thereby constructing an HST capable of stepless speed change.

The drive train for transmitting power from the motor shaft 4 to the differential gear unit 23 is constructed as follows: a gear 25 is provided on the motor shaft 4 in the second chamber R2 and engages with a larger diameter gear 24 fixed onto the counter shaft 26. A smaller diameter gear 21 fixed to the counter shaft 26 engages with a ring gear 22 of the differential gear unit 23. The ring gear 22 drives the differential gear unit 23 so as to transmit therethrough power from the motor shaft 4 to the left and right axles 7.

Figure 10:
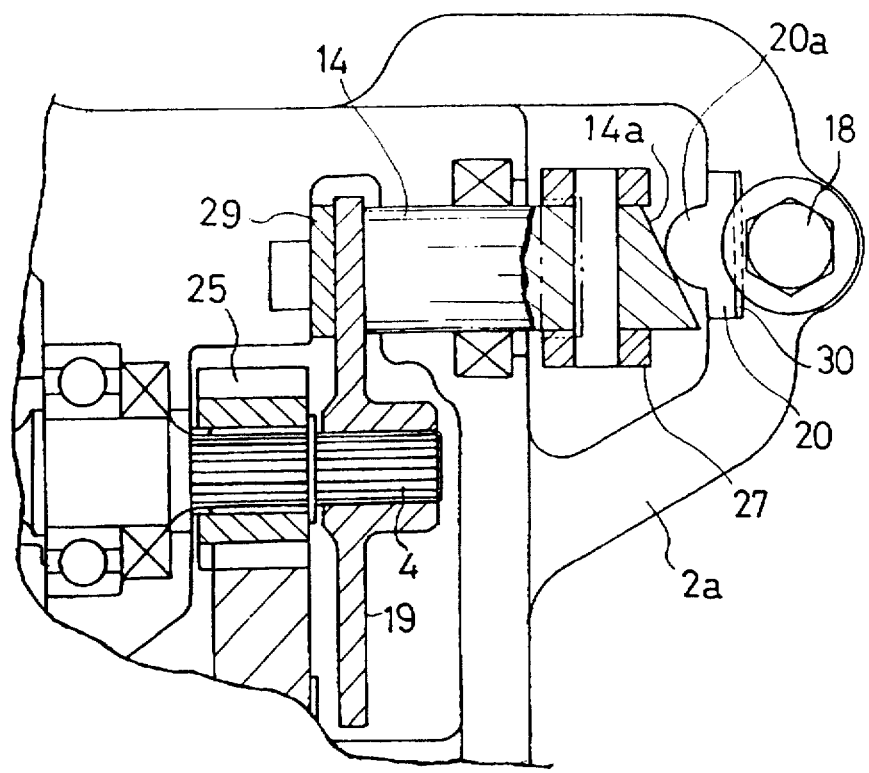
FIG. 10 is a partially sectional bottom view of a portion of brake unit.
Figure 11:
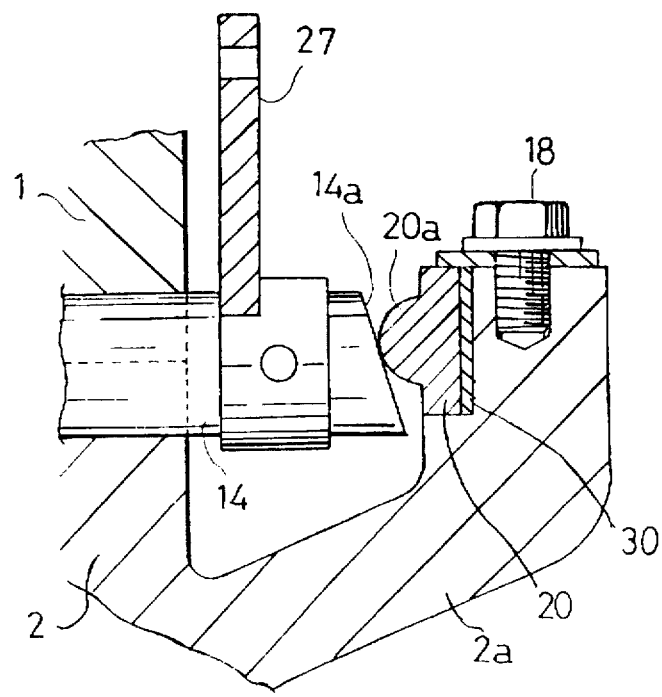
FIG. 11 is a sectional side view of the same.

At the one end of the motor shaft 4 is fixed a brake disc 19, which is contained in the second chamber R2 as shown in FIGS. 1, 10 and 11. A brake operating shaft 14 for braking operation extends in parallel to the motor shaft 4 and is rotatably supported at the joint surface of the upper half housing 1 and lower half housing 2. The brake operating shaft 14 and a brake pad 29 are disposed with the brake disc 19 therebetween. The brake pad 29 is fixedly sandwiched between the upper half housing 1 and the lower half housing 2. As best seen in FIGS. 10 and 11, the outer end of brake operating shaft 14 projects outwardly of the housing. A brake arm 27 is fixed thereto. The outer end of shaft 14 is formed with a slanted face defining a first cam surface 14a. At the side wall of the lower half housing 2 is formed a support portion 2a projecting in a manner of surrounding the outer end of the brake operating shaft 14. A groove is formed at the support portion 2a. A second cam surface 20 provided with a hemispherical projection 20a is fitted on support portion 2a. Projection 20a abuts against the first cam surface 14a. A shim 30 is interposed between the rear surface of the second cam surface 20 and the support portion 2a. A bolt 18 is screwed into the upper surface of the support portion 2a and prevents the second cam surface 20 from separating from the support portion 2a.

Figure 12:
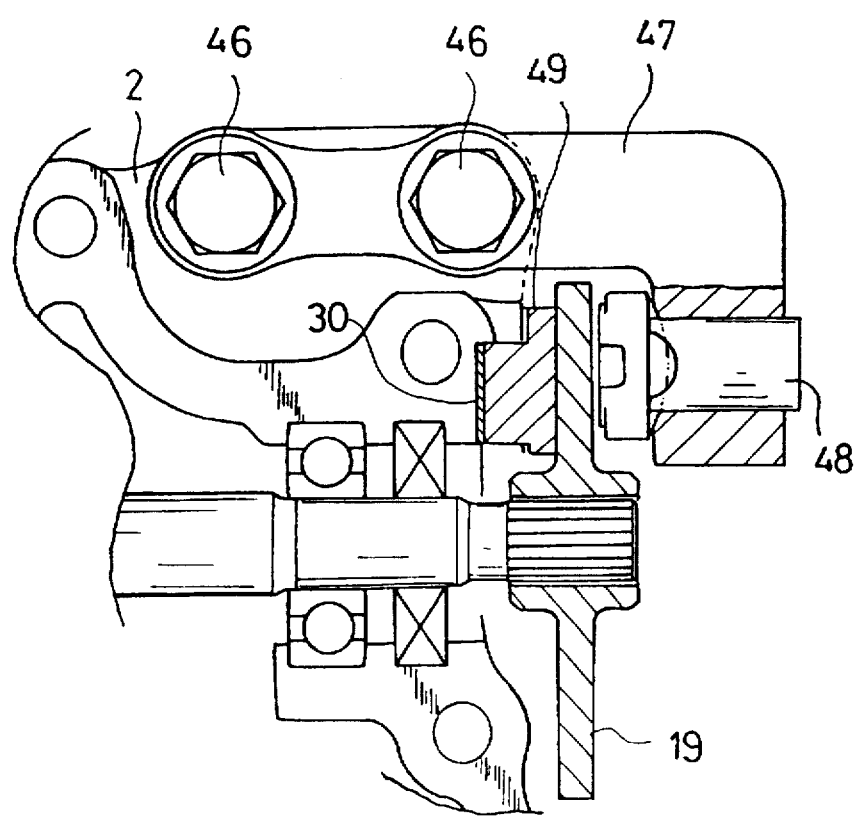
FIG. 12 is a sectional plan view of a comparison example of the brake unit.

In such construction, the thickness of shim 30 can be changed to enable adjustment of the idling of the inner end surface of the brake operating shaft 14 with respect to the brake disc 19. Conventionally, as shown in FIG. 12, in order to change the thickness of the shim 30 the bolts 46 are removed, and a brake stay 47, a brake arm 48, the brake disc 19 and a brake shoe 49, are removed from the lower half housing 2. As a result, it takes much time and is troublesome to mount or dismount the parts when the shim 30 is adjusted. But in this embodiment of the present invention, it is necessary to only unscrew the bolt 18 from the support portion 2a, thereby enabling the shim 30 to be simply adjusted.

When the brake arm 27 constructed as the abovementioned is moved longitudinally in a swinging motion, the brake operating shaft 14 is rotated causing the first cam surface 14a provided on the outer end surface of the brake operating shaft 14 to slide on the projection 20a of the second cam surface 20. The projection 20a rides on the longer portion of the slanted face of the first cam surface 14a, resulting in that the brake operating shaft 14 slides toward the brake disc 19. Hence, the brake disc 19 is put between the inner end surface of brake operating shaft 14 and the brake pad 29 so as to exert braking action onto the motor shaft 4.

A pair of arcuate ports 40a and 40b, as shown in FIG. 1, are open at the pump mounting surface 40 of the center section 5 so as to guide the feed and discharge oil into the ports 40a and 40b from the cylinder block 16. Similarly, a pair of arcuate ports are open at the motor mounting surface 41 so that the arcuate ports 40a and 40b and those at the motor mounting surface 41 are connected with each other through oil passages 5a and 5b respectively, thereby constructing a closed fluid circuit for circulating operating oil between the hydraulic pump and the hydraulic motor.

As best seen in FIG. 1, for example, a through opening S is formed in the center portion of the housing, when viewed in plan. That is, a dead space is formed in the housing, laterally of the drive train for transmitting power from the motor shaft 4 of the HST, and between the HST and the axles 7. Opening S extends from the exterior of upper half housing 1 to the exterior of lower half housing 2. In order to effectively use the dead space, a plurality of cooling fins 1f and 2f project from the outer walls of the upper half housing 1 and the lower half housing 2 along the peripheral wall of the opening S. A plurality of fins 1f and 2f project from the outer wall of the upper half housing 1 around the pump shaft 3. The cooling fins 1f and 2f are disposed to face the cooling fan 44. Hence, wind (indicated by the arrows in FIG. 3) flows downwardly through the opening S from the cooling fan 44, whereby the surface area of the housing is increased by the fins so as to improve the cooling efficiency of oil stored in the housing, and particularly oil stored in the first chamber R1.

Bolt-tightening bores are open at proper intervals therebetween on the joint surface of the upper half housing 1 and lower half housing 2 and on the peripheral wall around the opening S. The bolts 34 are tightened to fix the upper half housing 1 to lower half housing 2, whereby the rigidity of the housing is improved to contribute to reducing noises caused by the HST.

Figure 4:
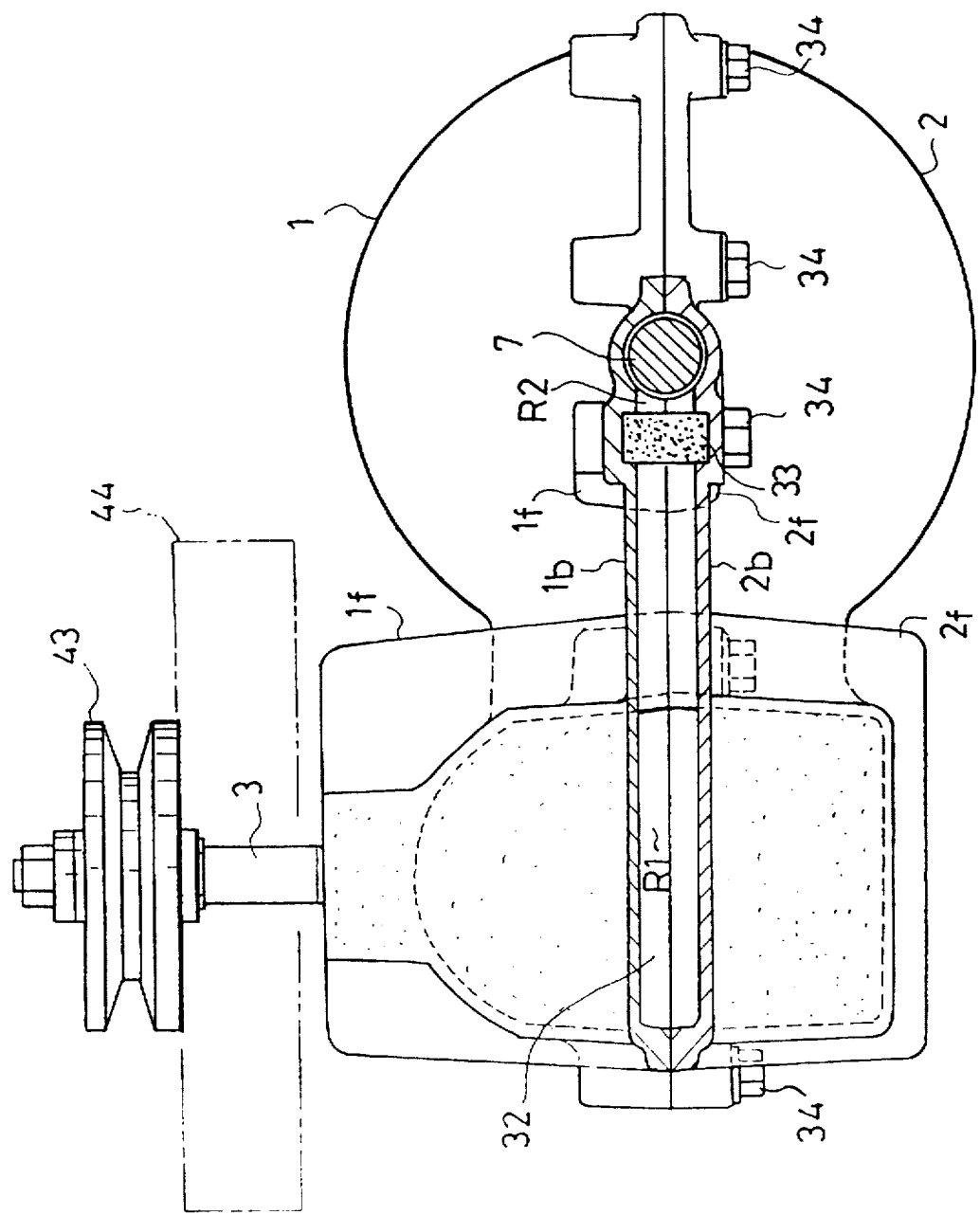
FIG. 4 is a sectional view looking in the direction of the arrows 4—4 in FIG. 1.
Figure 5:
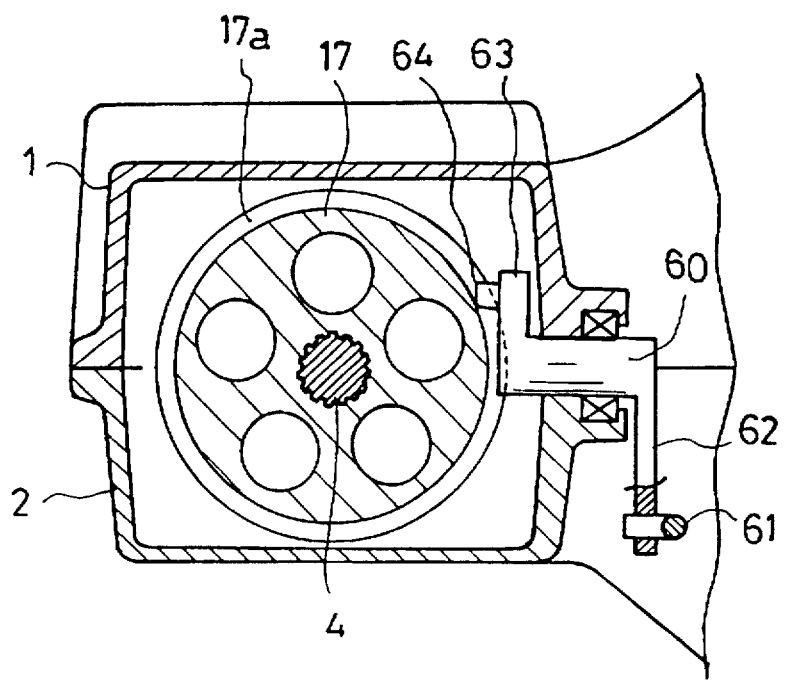
FIG. 5 is a sectional view looking in the direction of the arrows 5—5 in FIG. 1.

An oil passage 32, as shown in FIGS. 1 and 4, is formed at the joint surface of housing portions 1b and 2b. Oil passage 32 connects the housing portion containing the axles 7 and the housing portion containing the HST at the opposite side to the drive train, whereby the first chamber R1 communicates with the second chamber R2 through the passage 32. An oil filter 33 is disposed along oil passage 32, so that when lubricating oil in the second chamber R2 flows into the first chamber R1, a foreign object, such as iron powder created by the drive train, is prevented from entering into the first chamber R1.

Figure 8:
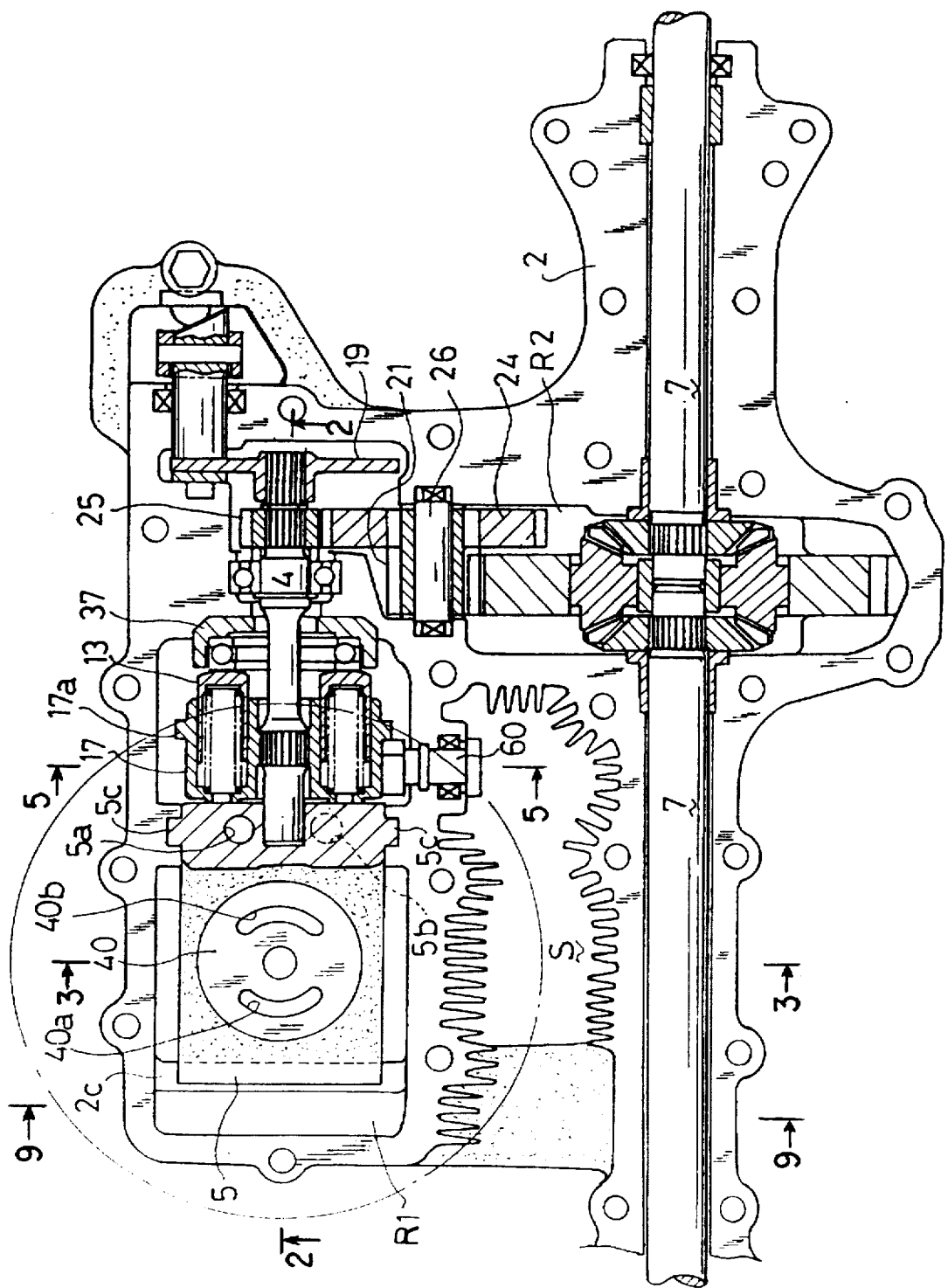
FIG. 8 is a plan view showing a modified embodiment of the invention in which a housing is provided with an opening.
Figure 9:
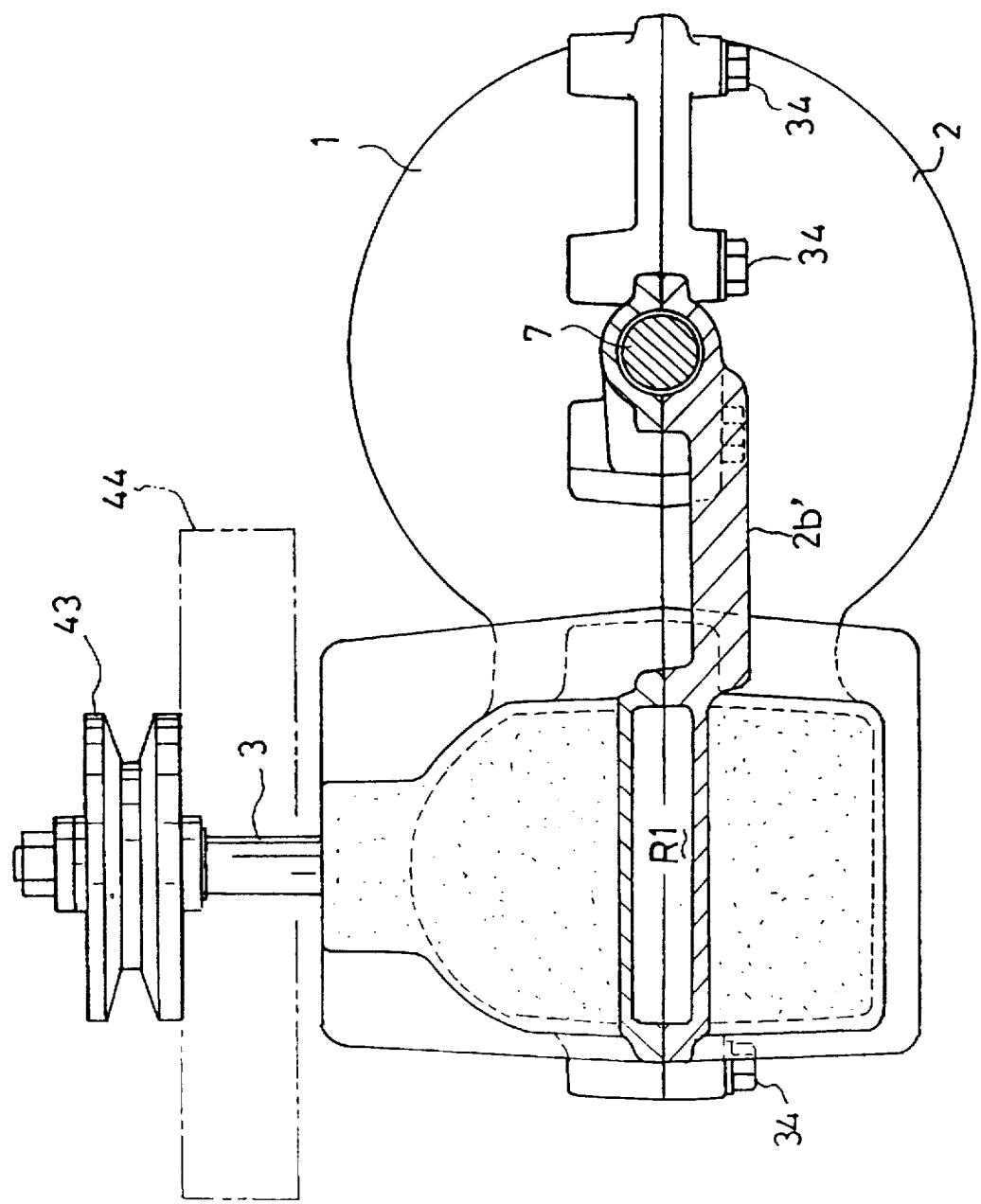
FIG. 9 is a sectional view looking in the direction of the arrows 9—9 in FIG. 8.

As shown in FIGS. 8 and 9, instead of providing the oil passage 32, the first chamber R1 for which houses therein the HST may be independent with respect to the second chamber R2. In this case, it is preferable that the housing portion of the first chamber R1 and the housing portion housing therein the axles 7, are connected with each other by use of a reinforcement portion 2b' extending from the lower half housing 2 or the upper half housing 1.

As seen from the above description, since the cavity-like opening S is formed in the housing between the axles and the HST, opposite to the cooling fan, a cooling wind from the cooling fan is intercepted by the housing so as not to flow laterally, but to flow through the opening S, thereby increasing the cooling surface area to effectively cool the operating oil in the HST. Furthermore, the cooling fan, when provided at the opening S, remarkably increases the surface area for receiving the cooling wind so as to enable the cooling efficiency to be improved.

As shown in FIGS. 1 through 5, in order to open closed fluid circuit in the oil sump in the first chamber R1 for idling the axle 7 when the vehicle is hauled, a by-pass shaft 60, for enabling the cylinder block 17 to be released from the motor mounting surface 41 is rotatably supported between the joint surface of the upper half housing 1 and the lower half housing 2. In other words, the by-pass shaft 60 is disposed between the joint surfaces and extends perpendicularly to the motor shaft 4, shaft 60 projects at its outer end into the opening S. An operating arm 62 is fixed thereto. At the utmost end shaft 60 is provided a link 61, or the like, so that the by-pass shaft 60 can be operated through the link 61 from the vehicle driver's cab. Also, the by-pass shaft 60 enters at its inner end into the first chamber R1. A rotary arm 63 is fixed thereto and an abutting pin 64 projects from the utmost end of rotary arm 63.

A flange 17a projects from the outer periphery of the cylinder block 17 and against the rear thereof. A pin 64 of the rotary arm 63 abuts against the rear of cylinder block 17. When the vehicle is hauled, the operating arm 62 is rotated from the exterior of the housing so as to rotate the rotary arm 63 through the by-pass shaft 60. The pin 64 urges the flange 17a to move the cylinder block 17 axially of the motor shaft 4, whereby the motor mounting surface 41 and the slidably rotatable surface of the cylinder block 17 are separated from each other. Hence, the oil passages 5a and 5b are open to the oil sump in the housing through the arcuate ports open at the motor mounting surface 41, thereby enabling the motor shaft 4 to freely rotate.

Figure 6:
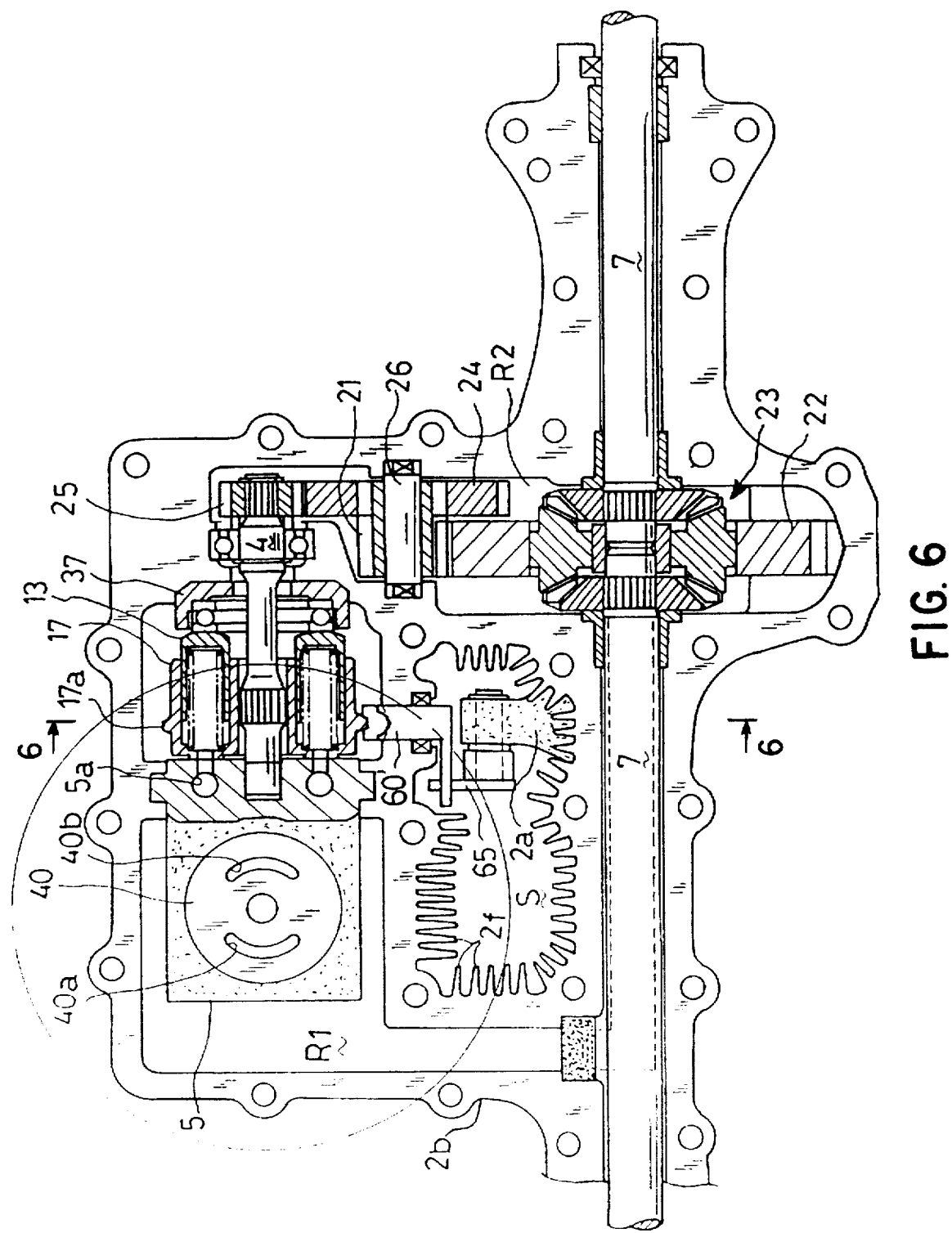
FIG. 6 is a partially sectional plan view of an embodiment of the invention disposing the rotary fulcrum for an operating lever at an opening in the housing.
Figure 7:
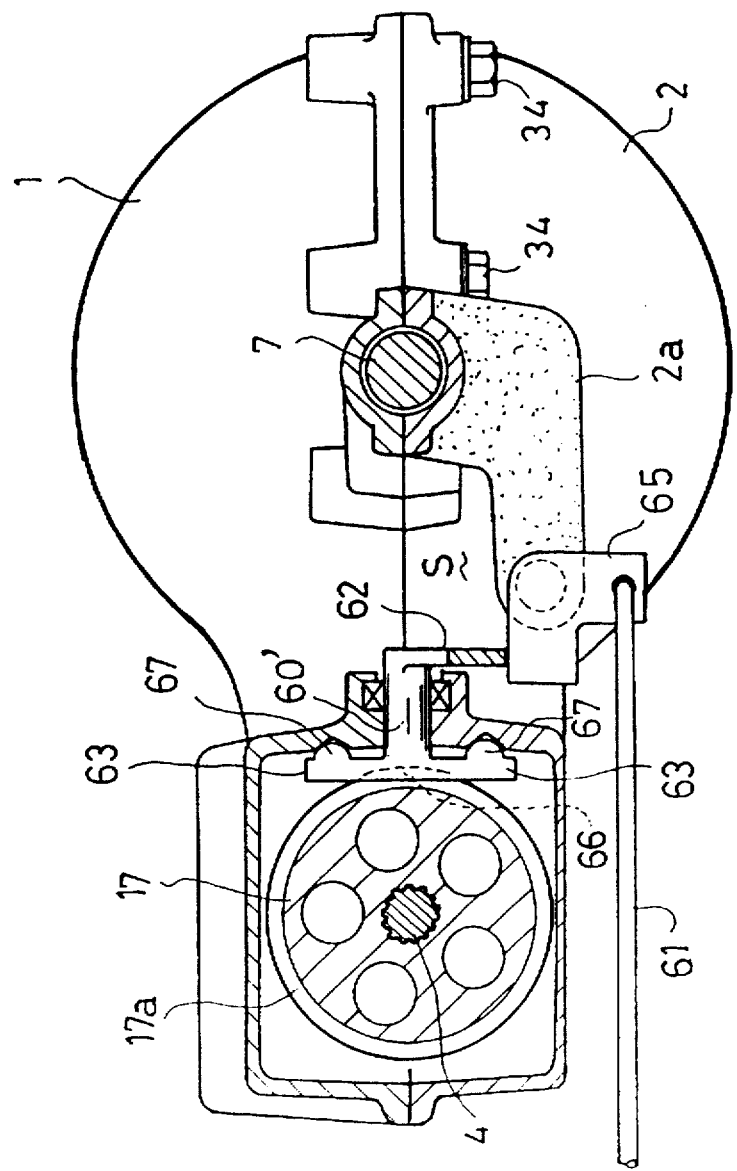
FIG. 7 is a sectional view looking in the direction of the arrows 6—6 in FIG. 6.

In an embodiment of the invention shown in FIGS. 6 and 7, a shaft 60' functions to brake the cylinder block 17. In other words, a support arm 2a integrally formed in the lower half housing 2 faces the opening S and pivotally supports a bell crank arm 65 at the utmost end of the support arm 2a. One end of the bell crank arm 65 is connected with a link 61 connected to a brake operating member (not shown) of the vehicle. The other end of the arm 65 is disposed to abut against the operating arm 62. A pair of radially extending rotary arms 63 are formed at the inner end of the shaft 60'. Cam surfaces 67 are formed on the back of the rotary arms 63 and are fitted into wedge-like cam grooves formed at the inner walls of the upper and lower half housings 1 and 2. At the input end surface of the rotary arm 63 is formed a groove 66 engageable with part of the flange 17a on the cylinder block 17. In such structure, when the link 61 is pulled from the exterior of the housing, an operating arm 62 is rotated through the bell crank arm 65, so that the cam 67 of the rotary arm 63 ride on shallow portions of the cam grooves and the shaft 60' moves toward the cylinder block 17, whereby the groove 66 engages with the flange 17a to enable the motor shaft 4 to be braked. Thus, the operating arm 62 is disposed in the opening S so as to not interfere with the lever, link or other accessories disposed on the housing, thereby increasing the degree of freedom in designing the housing.

For fixing the center section 5 in the housing, bolts, as are conventional, are not used. As shown in FIG. 2, receiving portions 2c and 2d, coincident in size with the lower surface of the center section 5, are provided at the inner bottom surface of the lower half housing 2. The receiving portions 2c and 2d are positioned above the oil filter 10 so as to enable the center section 5 to be positioned downwardly and given a reaction force of the piston at the hydraulic pump. Also, as shown in FIG. 1, at both sides of the vertical portion of center section 5 are provided projections 5c. At the upper half housing 1 and lower half housing 2 are formed recesses for receiving the projections 5c so that the projections 5c serve to upwardly and horizontally position the center section 5. Thus, the center section 5 is positioned in the housing by being sandwiched between the upper half housing 1 and the lower half housing 2 without using bolts whereby the axle driving apparatus of the invention can simply and quickly assembled resulting in lower manufacturing cost.

While a preferred embodiment of the invention has been described using specific terms, such description is for illustrative purpose only, and it is to be understood that changes and variations may be made without departing from the spirit or scope of the following claims.

What is claimed is:

1. An axle driving apparatus comprising:
   a housing;
   a hydrostatic transmission disposed in said housing, said hydrostatic transmission including an input shaft;
   an axle driven by said hydrostatic transmission disposed in said housing;
   a cooling fan disposed on said input shaft; and
   a through opening forming a dead space in said housing between said axle and said hydrostatic transmission.

2. An axle driving apparatus according to claim 1, further comprising:
   a plurality of cooling fins provided along the peripheral wall of said through opening.

3. An axle driving apparatus according to claim 1, wherein said input shaft is disposed substantially vertically.

4. An axle driving apparatus comprising:
   a housing;
   a hydrostatic transmission disposed in said housing, said hydrostatic transmission including an input shaft;
   an axle driven by said hydrostatic transmission disposed in said housing;
   a cooling fan disposed on said input shaft and projecting outwardly from one side of said housing; and a through opening forming a dead space in said housing, wherein wind which is generated on one side of said housing passes through said through opening to another side of said housing.

5. An axle driving apparatus according to claim 4, further comprising:

a plurality of cooling fins provided along the peripheral wall of said through opening.

6. An axle driving apparatus according to claim 4, wherein said input shaft is disposed substantially vertically.

* * * * *